(12) United States Patent
Das et al.

(10) Patent No.: US 6,417,402 B1
(45) Date of Patent: Jul. 9, 2002

(54) SQUARAINE BASED DYES AND PROCESS FOR PREPARATION THEREOF

(75) Inventors: Suresh Das; George Thomas Kakkudiyil; Biju Vasudevan Pillai; Santosh Unni; Suresh Velate, all of Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/962,082

(22) Filed: Sep. 26, 2001

(51) Int. Cl.⁷ ............................................. C07C 211/00
(52) U.S. Cl. ...................... 564/307; 564/427; 564/468; 546/102; 546/104
(58) Field of Search ................... 564/307, 427, 564/468; 546/102, 104

(56) References Cited

FOREIGN PATENT DOCUMENTS

| JP | 01232350 | * | 9/1989 |
| JP | 02013964 | * | 1/1990 |

* cited by examiner

*Primary Examiner*—Samuel Barts
(74) *Attorney, Agent, or Firm*—Burns, Doane, Swecker & Mathis, L.L.P.

(57) ABSTRACT

The present invention relates to squaraine dye containing terminal aminoanthracene or acridine groups and to a process for preparation thereof.

7 Claims, 6 Drawing Sheets

SQUARAINE BASED DYES AND PROCESS FOR PREPARATION THEREOF

FIELD OF THE INVENTION

The present invention relates to novel squaraine based dyes. More particularly, the present invention relates to squaraine based dyes with terminal aminoanthracene or acridinium units with absorption maximum above 700 nm of the formula 1 (1a, 1b, 1c)

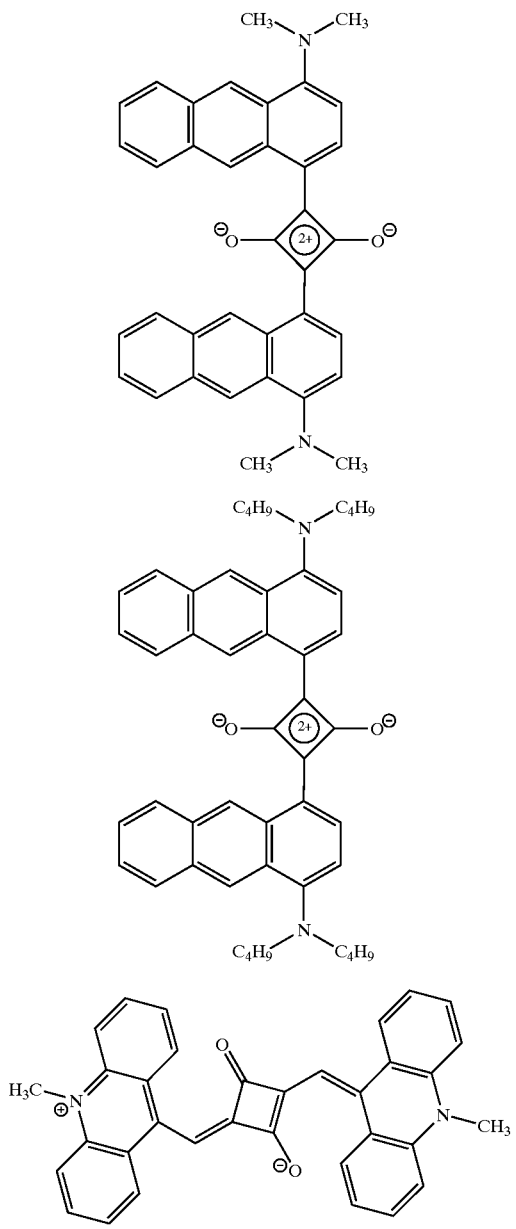

The present invention also relates to a process for the preparation of novel squaraine based dyes.

BACKGROUND OF THE INVENTION

Squaraine dyes belong to a class of compound formed by the condensation reaction of different nucleophiles such as aniline or pyrrole with squaraine acid (3,4-dihydroxy-3-cyclobutene-1,2-dione) Due to their unique properties, squaraine dyes are used in layered photo-responsive imaging, devices to extend the response capability of such devices to visible and infrared illumination These photo-responsive devices can therefore be utilised, for example, in conventional electrophotographic copiers as well as laser printers. These photoresponsive devices may comprise single or multilayered members containing photoconductive materials comprising squaraine compositions in a photogenic layer.

Photoconductive imaging members containing certain squaraine compositions are known. Also known are layered photoresponsive devices containing photogenerating layers and transport layers as described for example, in U.S. Pat. Nos. 4,123,270, 4,353,971, 3,838,095 and 3,824,099. Examples of photogenerating layer compositions disclosed in U.S. Pat. No. 4,123,270 include 2,4-bis(2-methyl-4-dimethylaminophenyl)-1,3-cyclobutadiene diylium-1,3-diolate, 2-4-bis-(2-hydroxy-4-dimethylaminophenyl)-1,3-cyclobutadine-diylium-1,3, diolate, and 2,4-bis-(p-dimetliylaminophenyl)1-3-cyclobutadine-diylium-1,3-diolate. Other patents disclosing photoconductive devices with squaraines are U.S. Pat. No. 6,042,980, U.S. Pat. No. 6,040,098, U.S. Pat. No. 5,342,719, U.S. Pat. No. 4,471,041, U.S. Pat. No. 4,486,520, U.S. Pat. No. 4,508,803, U.S. Pat. No. 4,507,480, U.S. Pat. No. 4,552,822, U.S. Pat. No. 4,390,610, U.S. Pat. No. 4,353,971 and U.S. Pat. No. 4,391,388.

Infrared absorbing dyes with high extinction coefficients are also useful for generating heat in the medium. In such a process exposure of the medium containing the dye to infrared actinic radiation of a frequency absorbed by the dye, results in generation of heat within parts of the medium exposed to the radiation. Materials, which undergo localized changes of state when, exposed to radiation of high energy density, e.g. laser light can be used in optical recording media. The thermally induced changes of state are associated with changes in the optical properties and are utilized for information and data recording. Use of squaraine dyes for such applications is described in U.S. Pat. No. 4,830,951. The medium may also comprise a thermally sensitive material capable of undergoing a colour change upon exposure to heat. Use of squaraine dyes for such applications is described in U.S. Pat. No. 4,623,896, U.S. Pat. No. 4,663,518, U.S. Pat. No. 4,720,449, U.S. Pat. No. 4,960,901 and U.S. Pat. No. 5,153,169.

Many of the known squaraine dyes are fluorescent compounds emitting light in the visible and near-infrared region. Consequently another use proposed for squaraine dyes is in the area of assays. Fluorescent compounds have achieved wide application in assays because of their ability to emit light upon excitation with light with energy within certain energy ranges. More specifically there is considerable interest in fluorescent dyes emitting in the near-infrared region. Such fluorescers have found employment as labels in chemical and biochemical processes. Fluorescent labels find applications in immunoassays, involving specific binding, pairs, such as ligands and receptors, for example, antigens and antibodies. Another use of fluorescent compounds is to incorporate such compounds into a cell wall or liposome. The cell or the liposome with the fluorescent compound incorporated therein can also be employed in assays. For example, dyes incorporated into cell membranes are usefull in the area of blood typing where a chance in fluorescence because of agglutination of cells is determined. Liposomes containing fluorescent dyes also find application in immunoassays. Furthermore such fluorescent compounds should be preferably soluble in aqueous medium or be at least water compatible.

Laser beams find use in the assay area as means for irradiating a fluorescent compound. In the filed of assays it is important to avoid background signals produced in relation to the amount of the analyte, contributed by materials other than the analyte. For example serum or plasma from a patient is often used to conduct the assay. Serum is itself fluorescent, however the materials in the serum or plasma that are fluorescent normally absorb light at wavelengths below 600 nm. Therefore it is desirable that the dyes employed in fluorescence assays possess absorption maximum greater than 600 nm, since the signal to noise ratio improves with increasing wavelength of absorption and emission of the dye. A major bottleneck in the complete utilization of near infrared absorbing dyes for such applications is that dyes absorbing in this region have low fluorescence quantum yields. Squaraine dyes synthesized sing aromatic heterocyclic for use in such applications have been described in U.S. Pat. No. 5,310,922; U.S. Pat. No. 5,329, 019, and U.S. Pat. No. 5,416,214. However, the squaraine dyes described in these patents possess absorption and emission maxima below 700 nm.

Furthermore, several patents disclose processes for preparing squaraine compositions. For example, U.S. Pat. No. 4,5484,220 illustrates a squaraine forming process by the reaction of squaric acid, and an aromatic aniline in the presence of an aliphatic amine. In addition, a process for the preparation of squaraines by the reaction of an alkyl squarate, and an aniline derivative in the prescience of aliphatic alcohol, and an optional acid catalyst is described in U.S. Pat. No. 4,524,219. U.S. Pat. No. 4,524,218 discloses a process for the preparation of squaraines by the reaction of squaric acid with an aromatic amine, and a composition selected from the group consisting of phenols and phenol squaraines, which reaction is accomplished in the presence of an aliphatic alcohol, squaraines, which reaction is accomplished in the presence of an aliphatic alcohol, and an optional azeotropic catalyst. Other processes for preparing squaraines are illustrated in U.S. Pat. No. 4,525,592, which describes the reaction of dialkyl squarate, and an aniline derivative in the presence of an aliphatic alcohol and an acid catalyst. A method for synthesis of squaraines and intermediates for the synthesis of these compounds is described in U.S. Pat. No. 5,919,950. Process for preparation of squarylium dyes is also described in U.S. Pat. No. 5,656,750 and a method for making water soluble squaraine dyes is described in U.S. Pat. No. 5,625,062.

Novel unsymmetrical squaraines and methods for their preparation have been described in U.S. Pat. No. 4,521,621 and U.S. Pat. No. 5,030,537. Although the above squaraines, and processes thereof are suitable for their intended purposes, there continues to be a need for other squaraine dyes with strong absorption and emission characteristics beyond the 700 nm region. More specifically with regard to imagine devices, there remains a need for stable imaging dyes with certain stable physical and electrical characteristics, with improved sensitivity in the >700 nm region. Enabling the use of such dyes in different imaging and printing processes, including processes wherein diode lasers are used. New infrared dyes are needed which absorb at specific wavelength for such applications. Use of naptholactam squaric acid dyes which belong to a class of Squaraine dyes that contain hetrocyclic enamine type terminal groups in optical recording materials is described in U.S. Pat. No. 4,830,951. Squaraine dyes possessing tertiary arylamine end groups have the potential for better stability than those with the heterocyclic enamine type end groups. It has however hitherto not been possible to produce squaraine dyes containing tertiary arylamile end groups absorbing beyond 700 nm. Squaraine dyes containing aminothiophene terminal groups possessing absorption red shifted to that of squaraine dyes containing terminal dialkylaniline groups has been reported. The maximum absorption wavelength that could be observed was 705 nm [Kiel, D.; Hartmann, H.; and Moschny, T., Dyes and Pigments, 17,19,(1991)]. A squaraine derivative containing 2,3-dihydropyrimidine terminal groups with absorption in the 800 nm region has been reported [Glieter, R.; Pflasterer, G.; Nuber, B.,*J. Chem. Soc.*, Chem. Commun. 452 (1993); U.S. Pat. No. 5,625,062]. However these squaraine derivative contain secondary amines.

Also, there continues to be a need for new fluorescent dyes with improved absorption in the near infrared region, possessing long fluorescent lifetimes for application as biological probes for the analysis of DNA, lipids, peptides and proteins [Soper, S. A. Mattingly, Q.I., *J. Am, Chem Soc.* 116,3744, (1994)].

OBJECTS OF THE INVENTION

The main object of the present invention is to provide novel squaraine based dyes.

It is another object of the invention to provide a process for the preparation of squaraine based dyes containing tertiary amino anthracene.

It is a further object of the invention to provide novel squaraine dyes possessing high extinction coefficients in the near infrared region and hence useful as near infrared absorbed in thermal imaging processes.

A further object of the invention is to provide novel squaraine dyes useful inter alia as near infrared fluorescent labels for immunoassays

SUMMARY OF THE INVENTION

The aim of the present invention is to provide novel tertiary amino anthracene containing squaraine compositions and processes for the preparation thereof. The novel squaraine dyes and novel compositions containing such dyes have an absorption ranging from 650–820 nm with a maximum ranging from 780 to 800 nm and both lipophilic and hydrophilic dyes are reported in this invention. In addition, novel squaraine dyes with absorption maxima in the 900 nm region, containing acridine chromophores is also reported.

The compounds of the present invention can be prepared by a reaction sequence, some or all of the individual steps of which are separately known in the art. Most of the squaraine dyes of the present invention can be made according to procedures similar to those described in literature [Sprenger, H.-E., Ziegenbein, W. Angew, Chem. Int. Ed. Engl. 6,553, (1967); Sprenger, H.E-; Ziegenbein W. Angew, Chem Int. Ed Engl. 7,530 (1968); Schmidt. A. H. synthesis 961 (1980)]. In general, squaric acid (3,4-dihydroxy-3-cyclobutene-1,4-dione) is condensed with the aminoanthracene derivatives under conditions for removing water from reaction mixture and purifying the dye by crystallization or chromatography. The group or functionality imparting hydrophilicity or lipophilicity to the compound of the invention can be introduced into the aminoanthracene derivative before the condensation reaction.

The squaraine dyes of the patent can be conjugated to specific binding pair (sbp) members such as antigens and antibodies by techniques that are known in the art. On the other hand, a linking group as described above can be introduced to the squaraine dye or the sbp member for attachment to the other component. A functionality for attachment of carboxylic acid, hydroxyl, thio, amino, aldehydic, amido, activated ethylenes such as maleimide, sulfonic acid, and the like can be introduced into the squaraine dye or the sbp member if such functionality is not originially present in the dye. Methods of conjugation involving sbp members are described in e g. U.S. Pat. No. 3,817,837. The dyes produced by the processes of the present invention may be used in any of the applications in which prior art near infrared absorbers have been used. The dye can be used in printing inks intended to provide markings that can be read under near infrared radiation, for example, on packages of consumer items intended to be scanned by infrared laser scanners. The dyes may also be useful as charge transfer materials in xerography and electro photography.

The novel squaraine dyes described in the present investigation possess high extinction coefficients in the near infrared region and will hence be useful as near infrared absorbed in thermal imaging processes described in the U.S. Pat. No. 4,602,263 U.S. Pat. No. 4,826,976 and U.S. Pat. No. 4,830,951.

Accordingly the present invention provides novel squaraine dye containing terminal aminoanthracene or acridine groups represented by the formula 1 (1a, 1b and 1c)

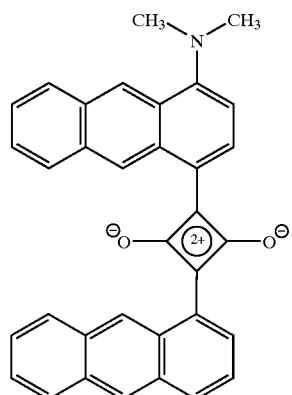

1a

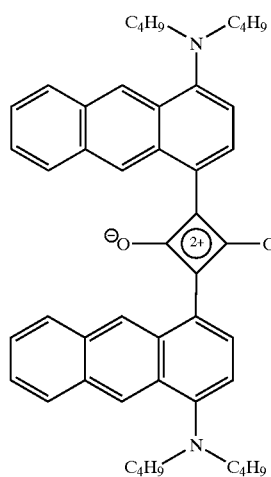

1b

The present invention also relates to a process for the synthesis of a novel squaraine dye containing terminal aminoanthracene or acridine groups represented by the formula 1 (1a, 1b and 1c)

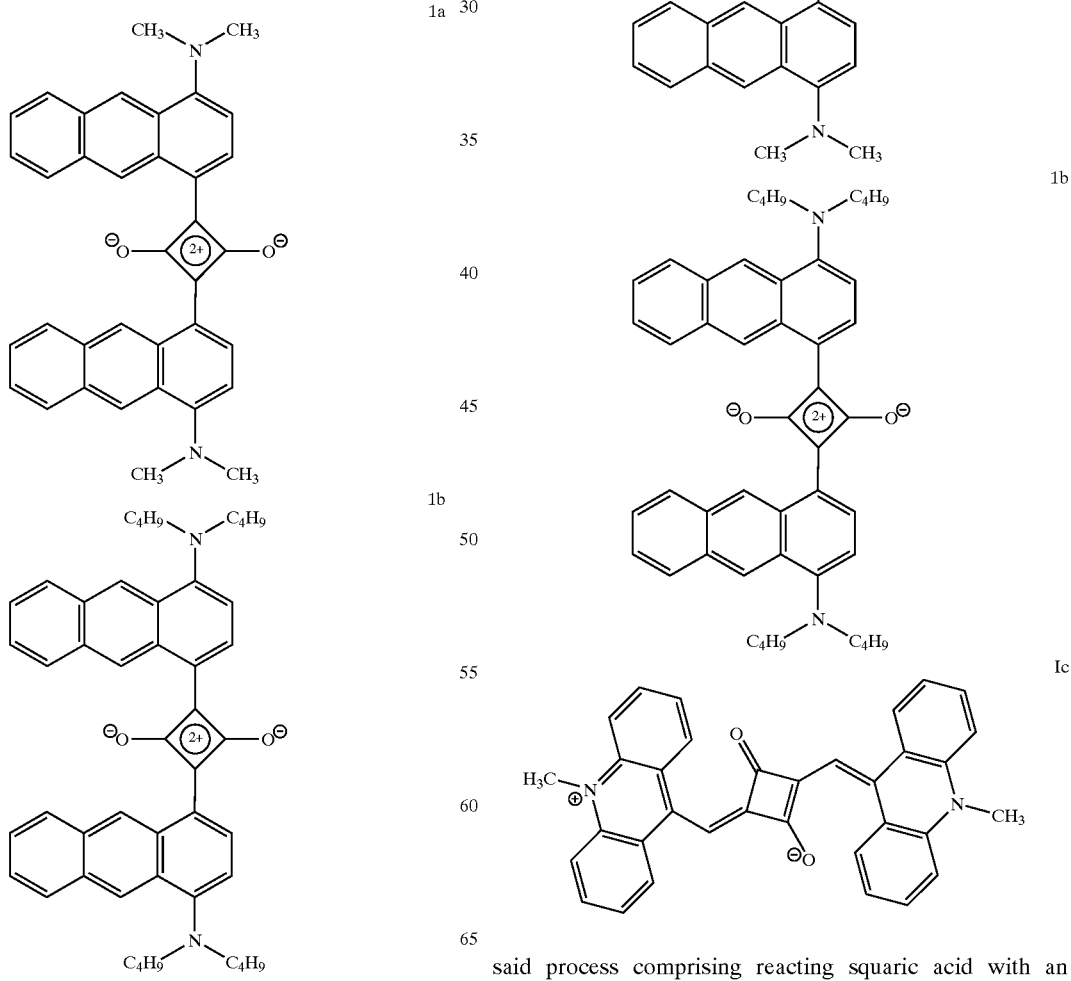

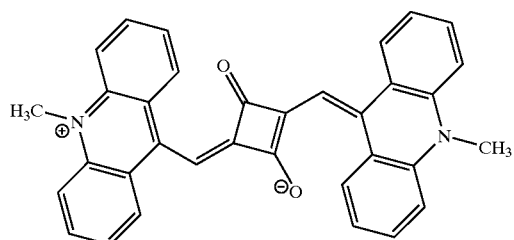

Ic said process comprising reacting squaric acid with an anthracene or an acridine chromophore in an organic solvent with simultaneous removal of water formed, cooling the reaction mixture, filtering and drying residue obtained, recrystallising the residue in an organic solvent to obtain a substantially pure product.

In another embodiment of the invention, the anthracene chromophore used comprises 1-N,N-dibutylaminoabnthracene.

In yet another embodiment of the invention, the acridinine chromophore used comprises 6-methylacridinium iodide.

In a further embodiment of the invention, the organic solvent used for the reaction is selected from 1-butanol, n-butanol, benzene, and a mixture thereof In another embodiment of the invention, the acridine compound is reacted with squaric acid in the presence of a base comprising pyridine.

In another embodiment of the invention, the organic solvent used for recrystallisation comprises a mixture of chloroform and methanol in a ratio of 1:4.

The dyes are useful in imaging processes where absorption or near infrared radiation by the dye result, in acid generation in the medium as described in U.S. Pat. No. 5,286,612.

Yet another application of the dyes is its use as near infrared fluorescent labels for immunoassays.

BRIEF DESCRIPTION OF THE ACCOMPANYING DRAWINGS

In the drawings accompanying the specifications.

DETAILED DESCRIPTION OF THE INVENTION

Figure 1:
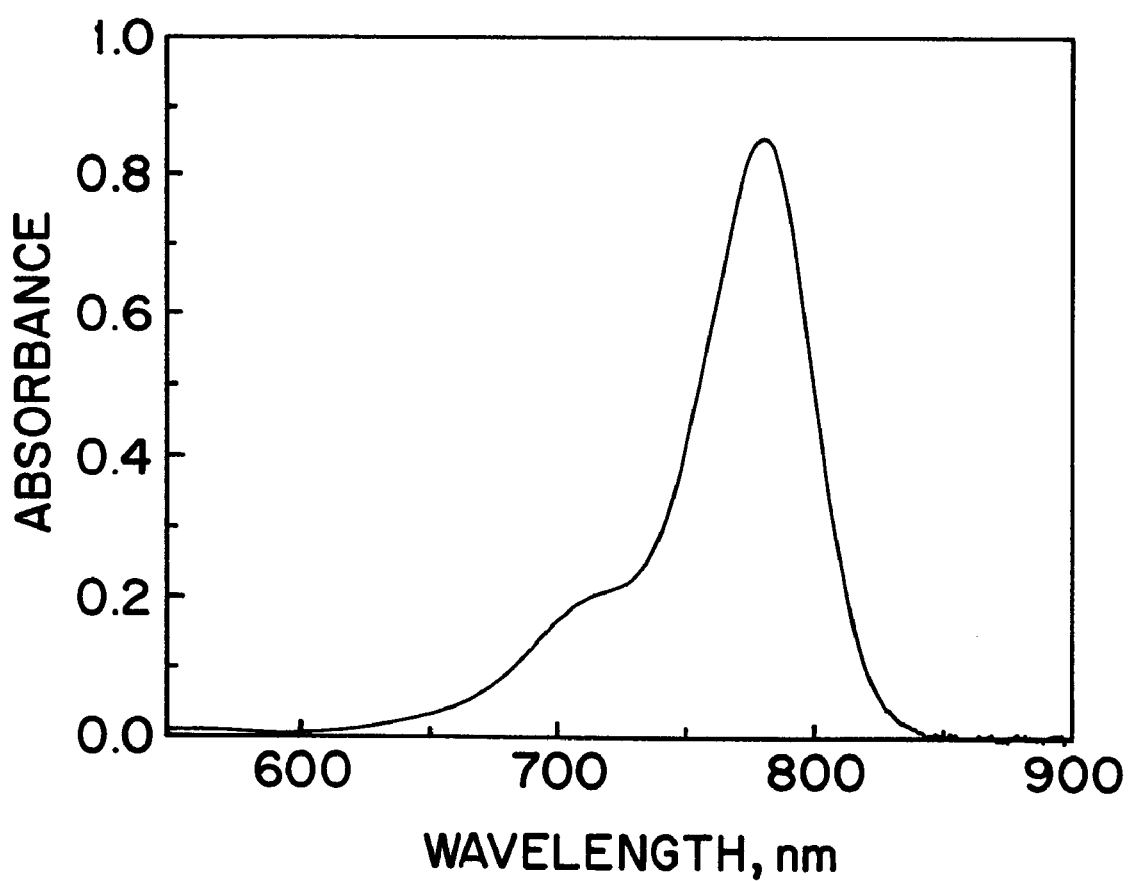
FIG. 1 represents the graph showing the absorption spectrum of Formula 1a in toluene.

Table 1 shows the absorption maxima of compounds of formula 1a, 1b and 1c in various solvents and in the solid state.

Table 2 shows the one and two electron oxidation potentials of Formula 1a and Formula 1b in dichloromethane versus Ag/AgCl.

Table 3 shows the fluorescence maxima and quantum yields of Formula 1a and Formula 1b in various solvents.

Formula 1b represents bis (N,N-dibutylaminoanthracene) squaraine and formula 1c represents bis (N-methyl-acridin-9-ylidine) squaraine.

The present invention has been completed based on the above findings and accordingly the present invention provides novel squaraine based dyes containing aminoanthracene terminal groups represented by formula 1a and formula 1b and derivatives thereof as well as squaraine dyes containing acridine as terminal groups represented by Formula 1c and derivatives thereof An embodiment of present invention is that these hovel dyes posses absorption maxima that are significantly red shifted compared to earlier reported arylamine containing squaraine dyes such as squaraine dyes containing terminal aniline groups. Another embodiment of the squaraine dyes of the present investigation that they possess very large extinction coefficient making them useful in optical recording media which require generation of heat in the medium following light absorption.

Another embodiment of the invention is that the dyes undergo reversible oxidation and the oxidation potentials of these dyes make them highly suitable for use in imaging application such as in photoacid generation and electroreprographic copies as well as in laser printers.

Yet another embodiment of the invention is that the dyes are highly fluorescent and can be used as fluorescent labels in immunoassays.

The following examples are given by way of illustration and therefore should not be construed to limit the scope of the present investigation.

EXAMPLE 1

Synthesis of formula 1a

A mixture. of N, N-dimethyl-1-aminoanthracene (110 mg, 0.5 mmol) and squaric acid (28 mg, 0:25 mmol) was heated at 120° C. in a mixture of 1-butanol (8 mL) and benzene (3.5 mL) for 12 h. The water formed during the reaction was distilled off azeotropically. After cooling, the reaction mixture was filtered and the residue was first purified by repeated precipitation from a mixture (1.4) of chloroform and hexane. The product was finally purified by recrystallization from chloroform to give 100 mg (78%) of formula 1a, IR $\nu_{max}$ (KBr), 1594 (CO) cm$^{31\ 1}$; UV $\lambda_{max}$ (CHCl$_3$) 789 nm ($\epsilon$ 144,000), $^1$H NMR (CDCl$_3$, 500 MHz) $\delta$ 3.39 (12H, s), 7.00 (2H, d, J-8.59 Hz, aromatic C2 proton), 7.53 (2H, t, J1–7:35) HZ, J2=6.98 Hz, aromatic C7 proton) 7.59 (2H, t, J1=6.98 Hz, J2=7.30 Hz, aromatic C6 proton), 7.99 (2H, d, J=8.25 Hz, aromatic C8 proton), 8.34 (2H, d, J=8.3 Hz, aromatic C5 proton), 8.60 (2H, s, aromatic C9 proton), 9.57 (2H, d, J=8.55 Hz, aromatic C3 proton), 10.58 (2H, s, aromatic C10 proton); Mol. Wt. Calcd. For $C_{36}H_{28}N_2O_2$ (MH+) 520.2150. Found (High-resolution mass spectrometry, FAB) 520.2151.

EXAMPLE 2

Synthesis of formula 1b

A mixture of 1-N, N-dibutylaminoanthracene (500 mg, 1.63 mmol) and squaric acid (93 mg, 0.815 mmol) in n-butanol (15 mL) and benzene (6 mL) was refluxed for 12 h with simultaneous removal of water formed in the reaction. The reaction mixture was cooled, filtered and dried. The solid product obtained was recrystallized from a mixture of (1:4) chloroform and petroleum ether to give 63 mg (18%) of formula 1b which melted at 192° C. IR (KBr) $\nu_{max}$ 1594 cm$^{-1}$ NMR (CDCl$_3$, 300 MHz) $\delta$ 1.9–0.7 (28H, m), 3.6 (8H, t) 7.07 (1H, d, aromatic C8 proton), 8.32 (1H, d, aromatic C5 proton), 8.59 (1proton), 9.51 (1H, d, aromatic C3 proton), 10.52 (1H, s, aromatic C10 proton); Mol. Wt. Calcd. For $C_{48}H_{52}N_2O_2$ (MH+) 688.4029. Found (high-resolution mass spectrometry, FAB) 688.4003

EXAMPLE 3

Synthesis of formula 1c

A mixture of 6-methylacridinium iodide (3 mmol) and squaric acid (0.15 mmol) was heated at 120° C. in a mixture (2.5) of 1-butanol and benzene for 12 h in the presence of pyridine. The water formed during the reaction was distilled off azeotiopically. After cooling, the reaction mixture was filtered and the residue was first purified by repeated washing with methanol. UV $\lambda_{max}$ (CH$_3$OH) 892 mm (41000 M$^{-1}$ cm$^{-1}$), Exact mass calculated 492.184; Found 492 IR $v_{max}$ (KBr) 2937, 1739, 1707, 1633, 1580, 1564, 1499, 1475, 1254, 1253, 1176, 1130, 1051, 756 cm$_{-1}$, $^1$H NMR (CDCl$_3$) δ 3.26 (s, N-CH$_3$), 6.55–7.25 (m, aromatic).

EXAMPLE 4

Figure 2:
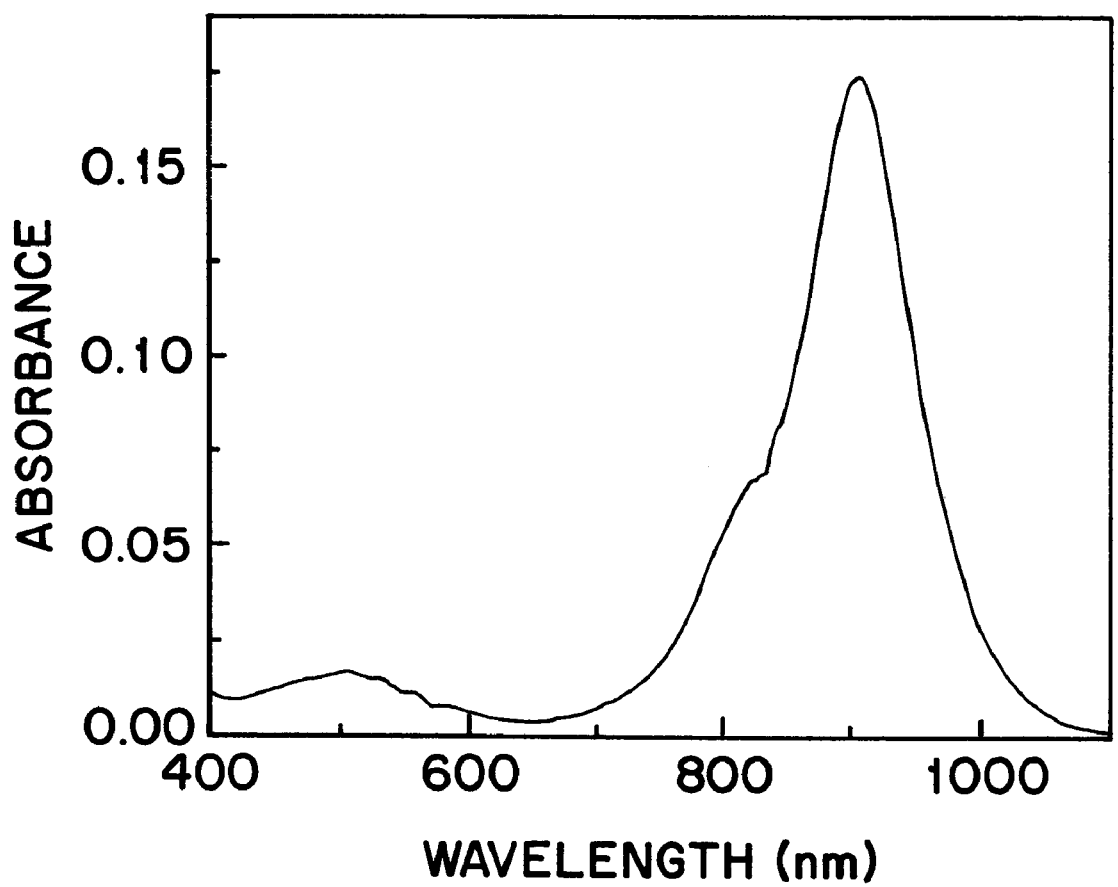
FIG. 2 represents the graph showing the absorption spectrum of Formula 1c in dichloromethane.
Figure 3:
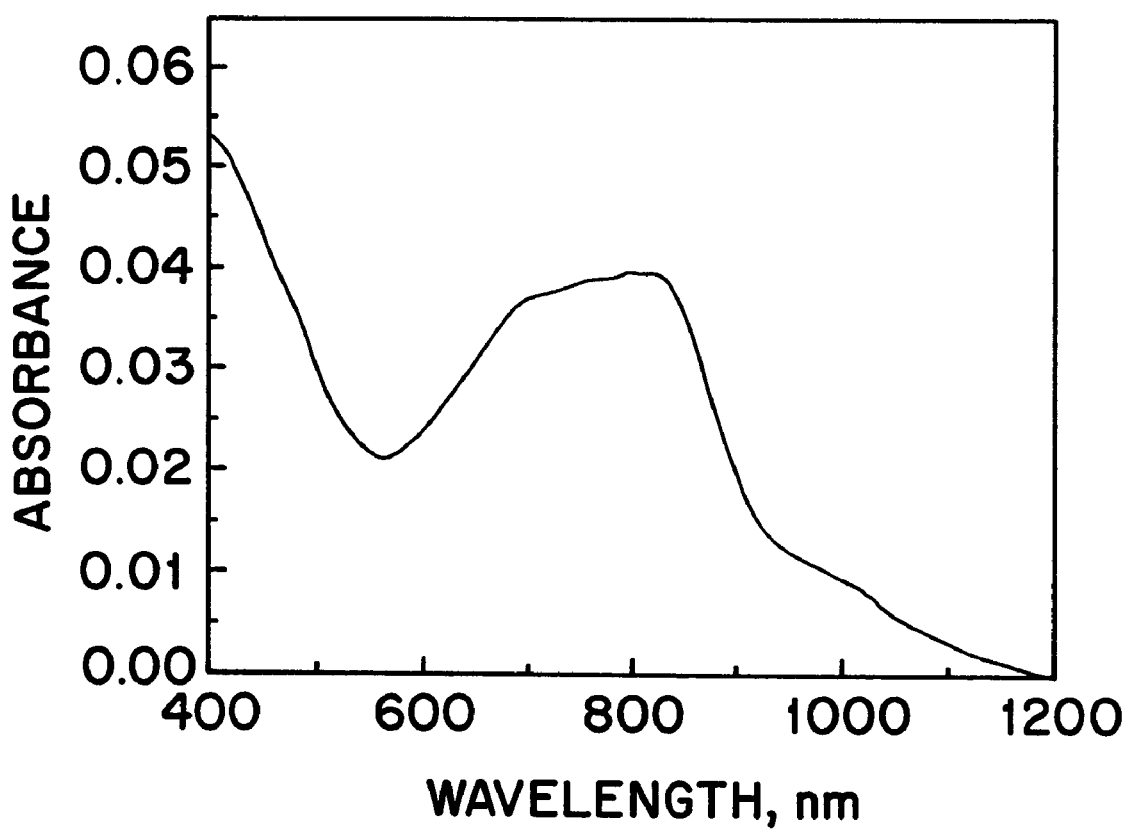
FIG. 3 represents the graph showing the absorption spectrum of Formula 1a in the solid state. The solid was deposited as a thin film by solvent evaporation of the solution of the dye in dichlorornethane.
Figure 4:
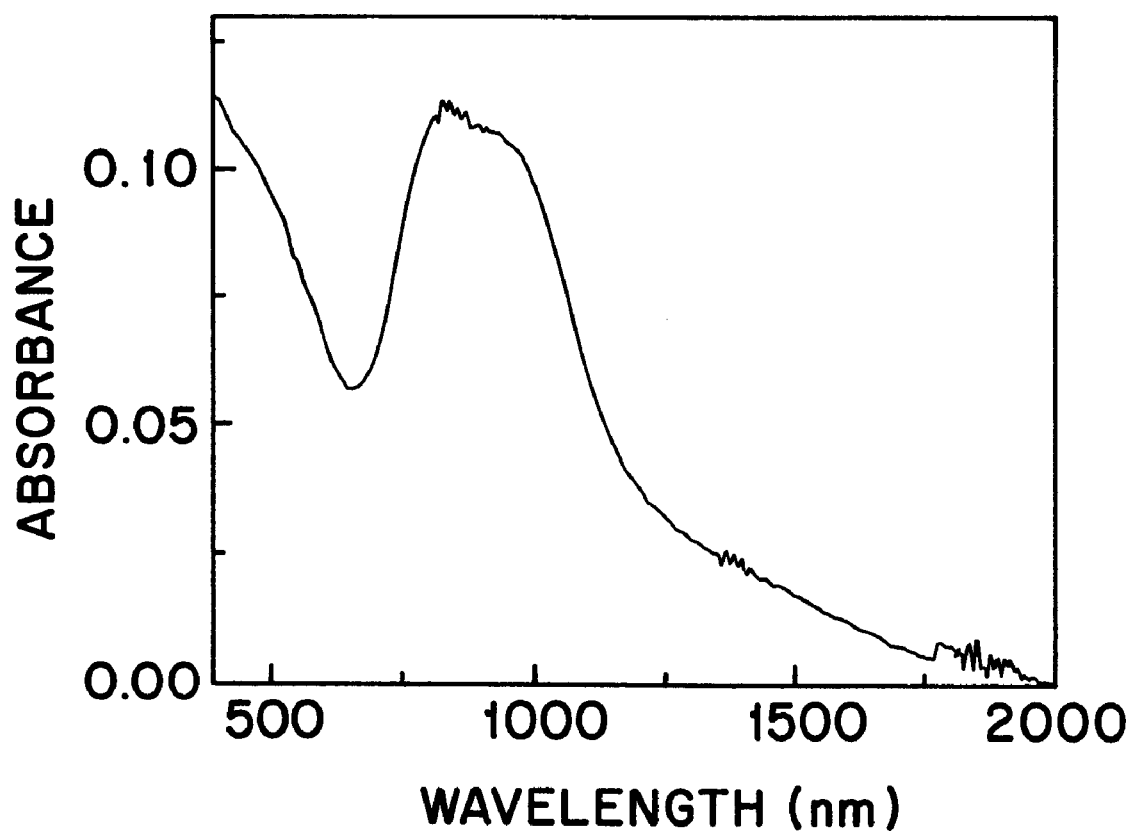
FIG. 4 represents the graph showing the absorption spectrum of formula 1c in the solid state. The solid was deposited as a thin film by solvent evaporation of the solution of the dye in dichlorornethane.

There is considerable interest in the development of new near infrared absorbing dyes, especially in the 750–800 nm region for use with diode lasers. FIG. 1 shows the absorption spectrum of formula 1a in toluene and its absorption spectrum in the solid state is shown in FIG. 3. FIG. 2 shows the absorption spectrum of formula 1c in dichloromethane and its absorption spectrum in the solid state is shown in FIG. 4. In solution the compound formula 1a shows a sharp absorption band with absorption maximum around 780 nm and compound Formula 1c shows a sharp absorption band with maximum around 900 nm. In the solid state, both the compounds shows panchromatic absorption throughout the visible region and near-infrared legion (upto 1000 nm in the case of Formula 1a and upto 1700 nm in the case of formula 1c). The absorption maxima and extinction coefficients of the dyes in different solutions and also in the solid state are listed in Table 1. The close match of the absorption maxima of the dyes with the output of semiconductor based solid state lasers make these dyes ideal candidates for applications in optical recording systems, thermal writing displays and laser, printino systems.

TABLE 1

| Compounds | λmax, nm (ε) | λmax, nm (in solid state) |
|---|---|---|
| Formula 1a | 782 (1 × 10$^5$)$^a$ | 830 |
| Formula 1b | 795 (0.95 × 10$^5$)$^a$ | 830 |
| Formula 1c | 892 (0.41 × 10$^5$)$^b$ | 905 |

$^a$in toluene;
$^b$in dichloromethane

EXAMPLE 5

Figure 5:
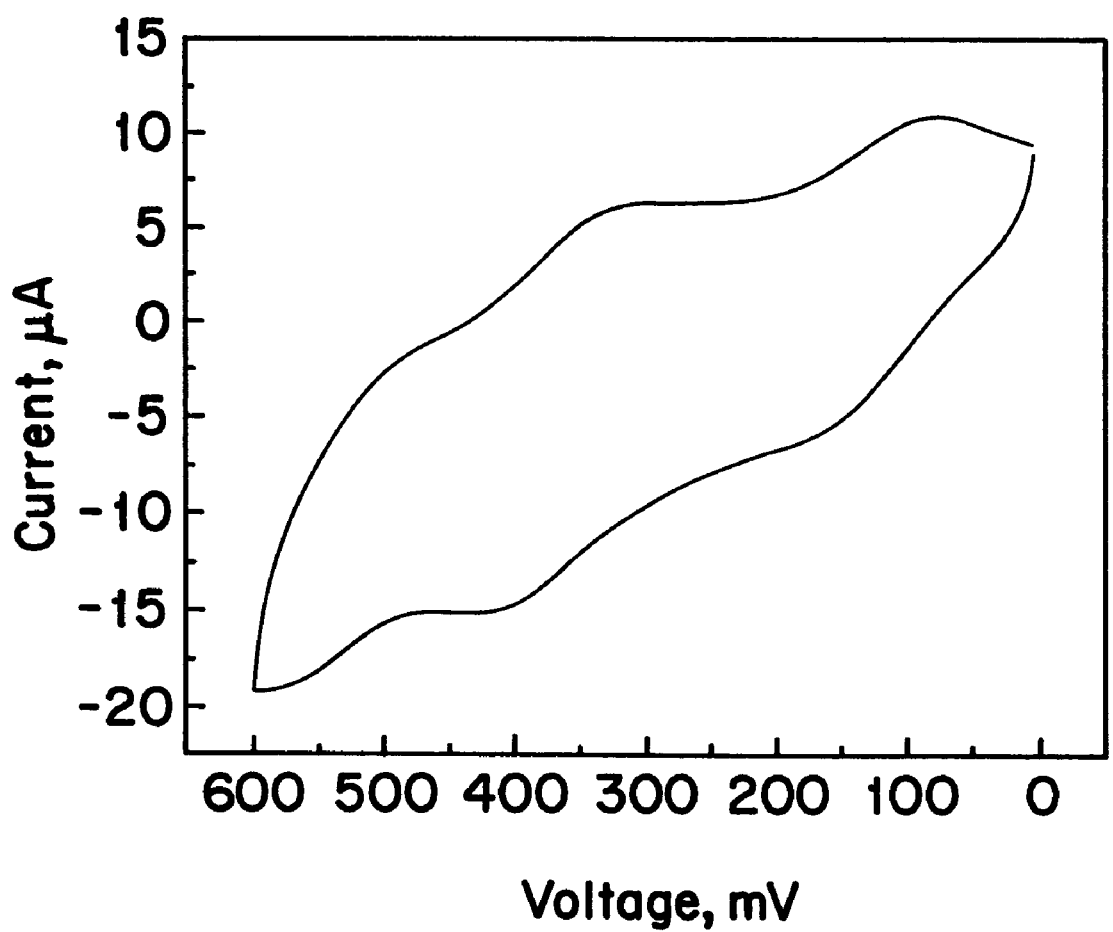
FIG. 5 represents the graph showing the Cyclic Voltammogram of Formula 1b in acetonitrile containing 0.1 M tetrabutyl ammonium perchlorate using SCE as a reference electrode.

The novel squaraine based sensitizers containing aminoanthracene terminal groups of the present invention are characterized by two reversible oxidation waves with reversible potentials, $E_{1,ox}$ and $E_{2,ox}$. FIG. 5 shows the cyclic voltammogram of Formula 1b in acetonitrile containing 0.1M tetrammonium perchlorate using SCE as the reference electrode, an $E_{1,ox}$ and $E_{2,ox}$ are 0.13 and 0.36V versus SCE.

The reversibility of the oxidation of the dyes as well as the ease of oxidation makes these dyes highly suitable for use in imaging processes involving photo-acid-generating processes. In the acid generating process excitation of the dye by absorption of infrared radiation is followed by transfer of an electron from the excited state dye molecule to an electron acceptor which is essentially a super acid precursor, resulting in the generation of the acid. Accordingly, to increase acid generation, it is desirable that the dye has a sufficiently low oxidation potential to provide a favourable free energy charge (G$^0$) for electron transfer. The oxidation potentials of the squaraines. The one electron oxidation potential of arylamine squaraines reported earlier in the range of 2.9–5.5 V versus Ag/AgCl whereas for the present dye it is of the order of 0.13 V versus Ag/AgCl.

Table 2 lists the $E_{1,ox}$ and $E_{2,ox}$ values of formula 1a and formula 1b in dichloromethane versus Ag/AgCl.

TABLE 2

| Compounds | $E_{1,ox}$, mV | $E_{2,ox}$, mV |
|---|---|---|
| Formula 1a | 0.13 | |
| Formula 1b | 0.13 | 0.36 |

EXAMPLE 6

Figure 6:
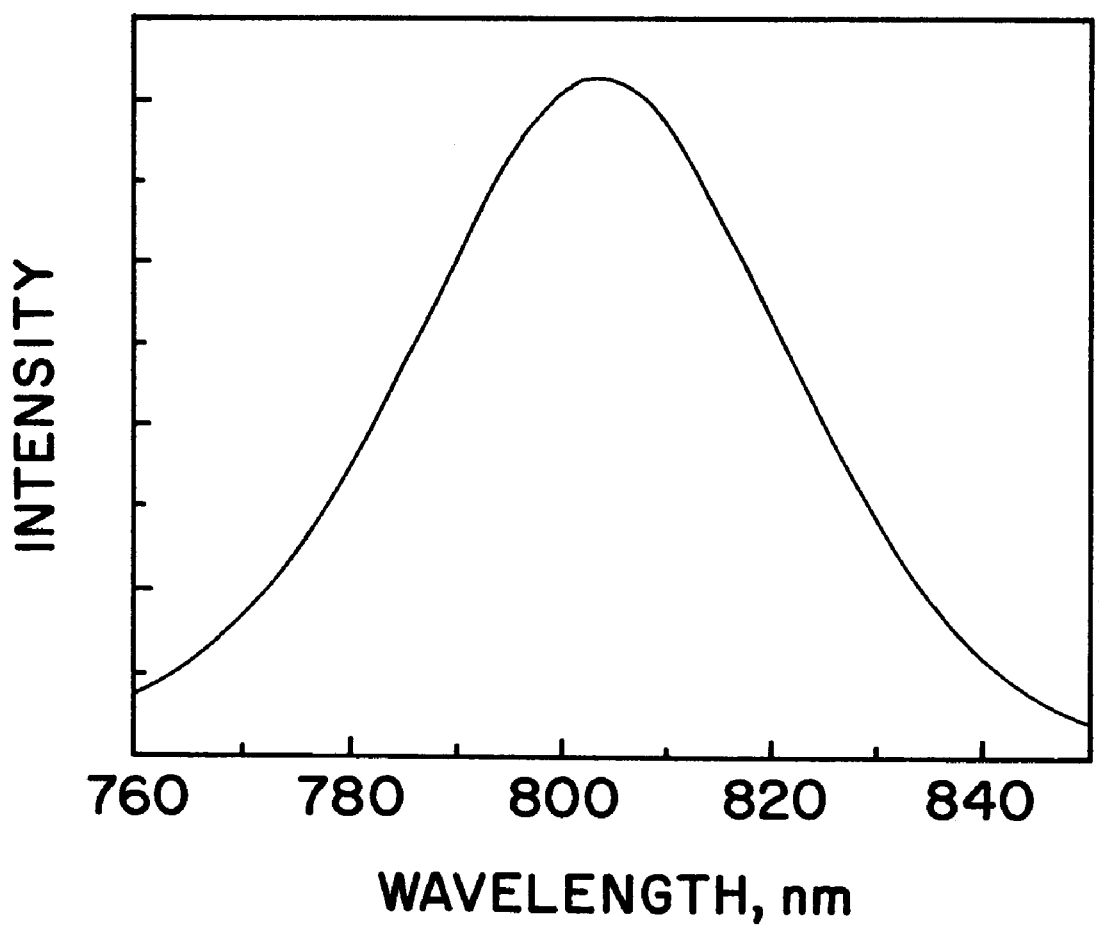
FIG. 6 represents the graph showing the emission spectrum of Formula 1a in toluene.

FIG. 6 shows the emission spectrum of formula 1a in toluene. The emission band is fairly sharp with a maximum at 824 nm. The emission quantum yield of formula 1a in toluene is 0.16 and the fluorescence lifetime is 1.78 ns. Table 3 summarises the fluorescence maxima and quantum yields of formula 1a and formula 1b respectively.

The difference in the absorption and emission maxima for this class of dyes is much larger than these for the corresponding squaraine dyes containing terminal aniline groups.

The desirable properties of near-infrared absorbing dyes for applicatiors in fluorescent assays are (i) high quantum yield of fluorescence, (ii) large differences between the absorption and emission maxima and (iii) sensitivity of the aforementioned fluorescence properties on the nature of the medium. The data summarized in Table 3, show that the novel squaraine dyes described in the present invention fulfill all these characteristics. Although the fluorescence quantum yields of these dyes are lower than that of the anilino squaraines, the very large bathoclhromic shift in the absorption and emission maxima of the aminoanthracene squaraines makes these dyes more suitable for applications as fluorescent labels in fluorescence assays. Moreover the dyes have much higher fluorescence quantum yields, compared to near-infrared fluorochromes with high fluorescence efficiencies reported in the literature, such as IR-125 and IR-132 [Soper, S. A and Mattingly, Q. L. J. Am. Chem. Soc., 116,3744, (1994)].

TABLE 3

| Solvent | Formula 1a (Em, max, nm φ) | Formula 1b (Em, Max, nm φ) |
|---|---|---|
| Toluene | 804 (0.16) | 815 (0.21) |
| Dichloromethane | 817 (0.064) | 820 (0.053) |
| Tetrahydrofuran | 808 (0.08) | 813 (0.064) |
| AOT/toluene | 804 (0.15) | 815 (0.17) |

Advantages

The squaraine based dyes of the present invention posses satisfactory properties required of near infrared absorbing dyes.
1. Squaraine dyes containing aminoanthracene terminal groups (formulae 1a and 1b) and acridine as terminal group (formula 1c) are pure single substances.
2. Their synthetic methodology is simple and economical.
3. They are stable to atmospheric influences and daylight.
4. They possess strong absorption in the near infrared region with absorption maxima centred around 780–800 nm.
5. Because of their strong absorption in the near infrared region the dyes are sensitive to light from solid state diode lasers emitting at near infrared wavelength above 700 nm.
6. The dyes can be used in optical recording systems requiring generation of heat, in the medium following light absorption as described in U.S. Pat. No. 4,830,951.
7. The dyes undergo reversible one and two electron oxidation reaction at potential much lower than that reported for squaraine dyes containing terminal aniline groups. The dyes can hence behave as excited state electron donors making them usefull as sensitizers for photoacid generation as described in U.S., Pat. No. 5,286,612.

8. The dyes posses high quantum yields of fluorescence in nonpolar environments and can hence be useful as fluorescent labels in immunoassays.

References Cited (Referenced by)

| | | | |
|---|---|---|---|
| 3817837 | Jun., 1974 | Rubenstien et al. | 436/543 |
| 3824099 | Jul., 1974 | Champ et al | 96/1 |
| 3838095 | Sep., 1974 | Johnson et al. | 260/38 |
| 4123270 | Oct., 1978 | Heil et al., | 8/172 |
| 4353971 | Oct., 1982 | Chang et al. | 430/58 |
| 4390610 | Jun., 1983 | Bowden et al. | 430/584 |
| 4391388 | Jul., 1983 | Krakauer | 221/764471041 |
| 4471041 | Sep., 1984 | Baranyi et al | 430/58.8 |
| 4486520 | Dec., 1984 | Yanus | 430/58.8 |
| 4507480 | Mar., 1985 | Horgan et al., | 546/94 |
| 4508803 | Apr., 1985 | Law et al., | 430/58.8 |
| 4521621 | Jun., 1985 | Yanus et al., | 564/307 |
| 4524218 | Jun., 1985 | Baranyi et al., | 564/307 |
| 4524219 | Jun., 1985 | Law | 564/307 |
| 4524220 | Jun., 1985 | Law | 564/307 |
| 4525592 | Jun., 1985 | Law et al., | 564/307 |
| 4552822 | Nov. 1985 | Kazmeir et al., | 430/58.8 |
| 4602263 | Jul., 1986 | Borrer et al. | 544/58 |
| 4623896 | Nov., 1986 | Hausslein | 347/232 |
| 4663518 | May, 1987 | Borrer et al., | 235/487 |
| 4720449 | Jan., 1988 | Borrer et al., | 430/338 |
| 4826976 | May, 1989 | Borrer et al., | 544/58.4 |
| 4830951 | May, 1989 | Dust et al., | 430/270 |
| 4960901 | Oct. 1990 | Borrer et al., | 548/207 |
| 5030537 | Jul, 1991 | Law et al., | 430/135 |
| 5153169 | Oct., 1990 | Freedman et al., | 503/209 |
| 5286612 | Feb., 1994 | Telfer | 430/335 |
| 5310922 | May, 1994 | Pease et al., | 548/156 |
| 5329019 | July, 1994 | Pease et al., | 548/455 |
| 5342719 | Aug., 1994 | Pai et al., | 430/58.8 |
| 5416214 | May, 1995 | Pease et al., | 546/94 |
| 5625062 | Apr., 1997 | Mader et al., | 544/249 |
| 5656750 | Aug. 1997 | Allen et al., | 540/1 |
| 5919950 | Jul, 1999 | Garcia et al., | 549/13 |
| 6040098 | Mar., 2000 | Black et al., | 430/59.6 |
| 5042980 | Mar., 2000 | Kierstein, et al., | 430/58.4 |

OTHER PUBLICATIONS

Kiel, D., Hartmann, H., and Moschny, T., Dyes and Pigments, 17,19 (1991)

Soper, S. A., and Mattingly, Q. I., J. Am. Chem. Soc. 116, 3744 (1994)

Sprenger, H.-E and Ziegenbein, W., Angew. Chem. Int. Ed. Engl. 6,553 (1967)

Sprenger, H-E., and Ziegenbein, W., Angew. Chem. Int. Ed. Engl. 7,530 (1968) Schmidt, A. H., Synthesis, 961 (1980)

Glieter, R.; Pflasterer, G.; Nuber, B., J. Chem. Soc. Chem. Commun. 452 (1993).

We claim:

1. Squaraine dye containing terminal aminoanthracene or acridine groups represented by the formula 1 (1a, 1b and 1c)

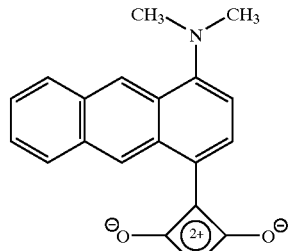

1a

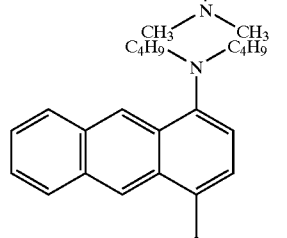

1b

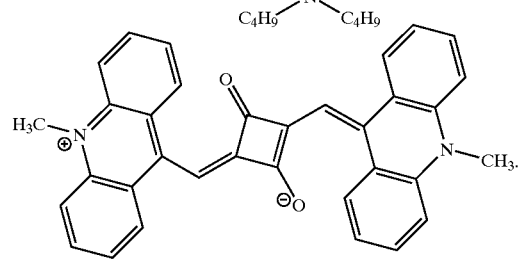

1c

2. A process for the synthesis of a novel squaraine dye containing terminal aminoanthracene or acridine groups represented by the formula 1 (1a 1b and 1c)

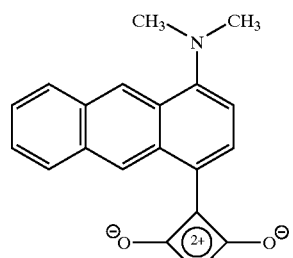

1a

-continued

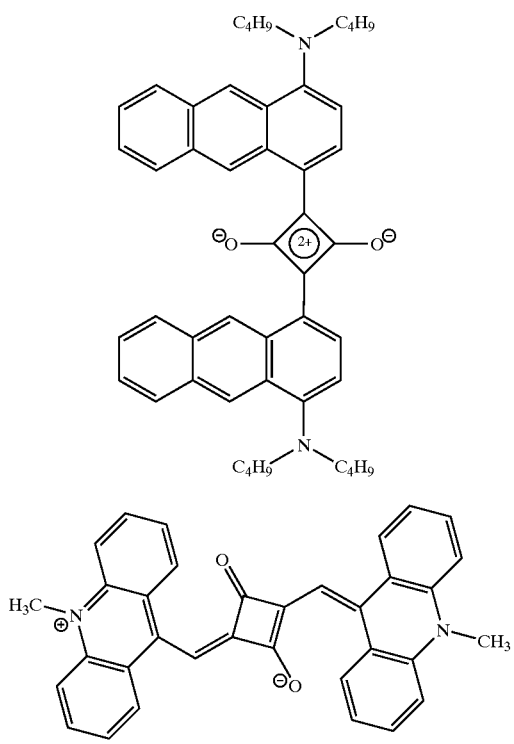

said process comprising reacting squaric acid with an anthracene or an acridine chromophore in an organic solvent with simultaneous removal of water formed, cooling the reaction mixture, filtering and drying residue obtained, recrystallising the residue in an organic solvent to obtain a substantially pure product.

3. A process as claimed in claim 2 wherein said aithracene chromophore used comprises 1-N,N-dibutylaminoabnthracene.

4. A process as claimed in claim 2 wherein said acridinine chromophore used comprises 6-methylacridinium iodide.

5. A process as claimed in claim 1 wherein the organic solvent used for the reaction is selected from 1-butanol, n-butanol, benzene, and a mixture thereof.

6. A process as claimed in claim 2, wherein the acridine compound is reacted with squaric acid in the presence of a base comprising pyridine.

7. A process as claimed in claim 2 wherein the organic solvent used for recrystallisation comprises a mixture of chloroform and methanol in a ratio of 1:4.

* * * * *